US006414082B1

(12) United States Patent
Rajagopalan et al.

(10) Patent No.: US 6,414,082 B1
(45) Date of Patent: *Jul. 2, 2002

(54) GOLF BALL COMPOSITIONS FORMED OF GRAFTED METALLOCENE-CATALYZED POLYMER BLENDS

(75) Inventors: Murali Rajagopalan, South Dartmouth; Kevin M. Harris, New Bedford, both of MA (US)

(73) Assignee: Acushnet Company, Fairhaven, MA (US)

( * ) Notice: Subject to any disclaimer, the term of this patent is extended or adjusted under 35 U.S.C. 154(b) by 38 days.

This patent is subject to a terminal disclaimer.

(21) Appl. No.: 09/594,031

(22) Filed: Jun. 15, 2000

Related U.S. Application Data

(63) Continuation-in-part of application No. 09/436,738, filed on Nov. 9, 1999, which is a continuation-in-part of application No. 08/950,197, filed on Oct. 14, 1997, now Pat. No. 5,981,658, which is a continuation-in-part of application No. 08/658,338, filed on Jun. 5, 1996, now Pat. No. 5,824,746, which is a continuation-in-part of application No. 08/482,514, filed on Jun. 7, 1995, now Pat. No. 5,703,166, which is a continuation-in-part of application No. 08/377,553, filed on Jan. 24, 1995, now abandoned.

(51) Int. Cl.[7] ........................ A63B 37/12; A63B 37/02; C08L 23/08; C08L 51/06

(52) U.S. Cl. ............................ 525/74; 525/72; 525/78; 473/354; 473/357; 473/365; 473/372; 473/373; 473/374; 473/377; 473/378; 473/385

(58) Field of Search ............................. 525/72, 74, 78; 473/354, 357, 365, 372, 373, 374, 377, 378, 385

(56) References Cited

U.S. PATENT DOCUMENTS

| 3,572,722 A | 3/1971 | Harrison et al. ............. 273/218 |
| 4,274,637 A | 6/1981 | Molitor ................... 273/235 R |
| 4,431,193 A | 2/1984 | Nesbitt ................... 273/235 R |
| 4,781,383 A | 11/1988 | Kamada et al. ............. 273/228 |
| 4,884,814 A | 12/1989 | Sullivan ................. 273/235 R |
| 4,986,545 A | 1/1991 | Sullivan ................. 273/235 R |
| 5,002,281 A | 3/1991 | Nakahara et al. ........... 273/220 |
| 5,098,105 A | 3/1992 | Sullivan ................. 273/235 R |
| 5,106,916 A | 4/1992 | Mitchell ..................... 525/255 |
| 5,187,013 A | 2/1993 | Sullivan ..................... 428/407 |
| 5,312,857 A | 5/1994 | Sullivan ..................... 524/400 |
| 5,321,089 A | 6/1994 | Cadorniga et al. .......... 525/196 |
| 5,330,837 A | 7/1994 | Sullivan ..................... 428/407 |
| 5,338,610 A | 8/1994 | Sullivan ..................... 428/407 |
| 5,346,963 A | 9/1994 | Hughes et al. ............... 525/285 |
| 5,367,028 A | 11/1994 | Hamada et al. ............. 525/221 |
| 5,397,840 A | 3/1995 | Sullivan et al. ............. 525/221 |
| 5,407,998 A | 4/1995 | Horiuchi et al. ............ 525/133 |
| 5,516,847 A | 5/1996 | Sullivan t al. .............. 525/221 |
| 5,542,677 A | 8/1996 | Sullivan et al. ............. 473/385 |
| 5,591,803 A | 1/1997 | Sullivan et al. ............. 525/196 |
| 5,703,166 A | 12/1997 | Rajagopalan et al. ....... 525/196 |
| 5,824,746 A | 10/1998 | Harris et al. ................ 525/196 |
| 5,830,087 A | 11/1998 | Sullivan et al. ............. 473/385 |
| 5,981,658 A | 11/1999 | Rajagopalan et al. ......... 525/72 |

FOREIGN PATENT DOCUMENTS

| EP | 0 266 994 A2 | 5/1988 |
| EP | 0 633 043 A1 | 1/1995 |
| GB | 2 278 609 A | 12/1994 |
| WO | WO 97/03123 | 1/1997 |
| WO | WO 97/03126 | 1/1997 |

OTHER PUBLICATIONS

Matthew H. Naitove, "Novel Rheological Behavior Claimed for New–Tech Polyolefins," Plastics Technology, Nov. 1992, pp. 23 & 25.
T.C. Yu et al., "Polyolefin Modification with EXACT™ Plastomers," SPE RETEC Polyolefins VIII Conference, Feb. 1993.
Exxon Chemical Co., "Exact Facts," Exxpol Technology, Jun. 1994 pp. 1–8.
Robert D. Leaversuch, "Metallocene Resins: Is the Revolution for Real?" Modern Plastics, Jun. 1994, pp. 48–50.
Jan H. Schut, "Competition for Metallocenes Could Turn Ugly," Plastics World, Jan. 1995, pp. 33–36.
Sentinel Products Update, Metallocene Polyolefin Foam & Cellular Rubber, Summer 1995.
Smith et al., "Applications and Advantages of Flexible Metallocene Polyolefin Foams," SPO '95, 1995, pp. 95–107.
P.S. Chum et al., "Structure/Property Relationships in Polyolefins Made by Constrained Geometry Catalyst Technology," Plastics Engineering, Jun. 1995, pp. 21–23.
Ann M. Thayer, "Metallocene Catalysts Initiate New Era in Polymer Synthesis," Chemical & Engineering News, Sep. 11, 1995, pp. 15–20.

*Primary Examiner*—David J. Buttner
(74) *Attorney, Agent, or Firm*—Swidler Berlin Shereff Friedman, LLP (57) ABSTRACT

The disclosed invention provides a golf ball comprising a core and a cover, wherein at least one of the cover or the core is formed from a polymer blend comprising at least one grafted metallocene-catalyzed polymer, at least one ionomer, and at least one non-ionomer having improved melt flow characteristics.

40 Claims, 2 Drawing Sheets

GOLF BALL COMPOSITIONS FORMED OF GRAFTED METALLOCENE-CATALYZED POLYMER BLENDS

This application is a continuation-in-part of application No. 09/436,738, filed Nov. 9, 1999, now pending, which is a continuation of application Ser. No. 08/950,197, filed Oct. 14, 1997, now U.S. Pat. No. 5,981,658, which is a continuation-in-part of application Ser. No. 08/658,338, filed Jun. 5, 1996, now U.S. Pat. No. 5,824,746, which is a continuation-in-part of application Ser. No. 08/482,514, filed Jun. 7, 1995, now U.S. Pat. No. 5,703,166, which is a continuation-in-part of application Ser. No. 08/377,553 filed Jan. 24, 1995, now abandoned.

FIELD OF THE INVENTION

The present invention relates to golf balls and, in particular, to golf balls having at least one layer comprising at least one olefinic polymer produced using a single-site metallocene catalyst in the polymerization process, to which at least one pendant functional group has been grafted by a post-polymerization reaction. The grafted metallocene-catalyzed polymer may be mixed with at least one of an ionomer, a non-grafted or unfunctionalized metallocene-catalyzed polymer, or other non-ionomeric polymer to form a blend, and may be foamed or unfoamed. The layer may be located in any of the cover or core of the ball or in a mantle layer located between the cover and the core.

BACKGROUND OF THE INVENTION

Three-piece, wound golf balls with balata covers are preferred by most expert golfers. These balls provide a combination of distance, high spin rate, and control that is not available with other types of golf balls. However, balata is easily damaged in normal play, and, thus, lacks the durability required by the average golfer.

In contrast, amateur golfers typically prefer a solid, two-piece ball with an ionomer cover, which provides a combination of distance and durability. Because of the hard ionomer cover, these balls are almost impossible to cut, but also have a very hard "feel", which many golfers find unacceptable, and a lower spin rate, making these balls more difficult to draw or fade. The differences in the spin rate can be attributed to the differences in the composition and construction of both the cover and the core.

Many attempts have been made to produce a golf ball with the control and feel of a wound balata ball and the durability of a solid, two-piece ball, but none have succeeded totally. For example, U.S. Pat. No. 4,274,637 discloses two- and three-piece golf balls having covers completely or partially formed from a cellular polymeric material to improve backspin, but does not provide any examples that compare the spin rates of the disclosed golf balls with those of prior art balls.

U.S. Pat. No. 5,002,281 et al. discloses a three-piece solid golf ball having an ionomer cover and a solid core consisting of a soft inner core and a hard outer shell, where the difference in the hardness of the two parts of the core is at least 10 on the JIS-C scale.

Similarly, U.S. Pat. No. 4,781,383 discloses a solid, three-piece golf ball, having an ionomer cover and a core with inner and outer layers, where the inner layer has a diameter of 24 to 29 mm and a Shore D hardness of 15 to 30, and the outer layer has a diameter of 36 to 41 and a Shore D hardness of 55 to 65. The percentage of the ball surface which contacts the club face when the ball is struck is 27 to 35%

European Patent Application 0 633 043 discloses a solid, three-piece golf ball with an ionomer or balata cover, a center core, and an intermediate layer. The center core has a diameter of at least 29 mm and a specific gravity of less than 1.4. The intermediate layer has a thickness of at least 1 mm, a specific gravity of less than 1.2, and a hardness of at least 85 on the JIS-C scale.

U.S. Pat. No. 5,703,166 employs compressible materials, i.e., gases, in the core of a solid construction golf ball to simulate the effects of trapped air in a wound ball.

None of these disclosures utilizes the unique physical properties of metallocene-catalyzed polymers, i.e., polymers produced using single-site metallocene catalysts, which produce polymers with a narrow molecular weight distribution and uniform molecular architecture, so that the order and orientation of the monomers in the polymer, and the amount and type of branching is essentially the same in each polymer chain.

The narrow molecular weight distribution and uniform molecular architecture provides metallocene-catalyzed polymers with properties that are not available with conventional polymers, and allow polymers to be produced having unique properties that are specifically tailored to a particular application. The desired molecular weight distribution and the molecular architecture are obtained by the selection of the appropriate metallocene catalyst and polymerization conditions.

Processes for grafting monomers onto polymers and, in particular, polyolefins, are known. European Patent Application No. 0 266 994 discloses a process for grafting ethylenically unsaturated monomers, such as unsaturated carboxylic acids and anhydrides and derivatives thereof, onto copolymers of ethylene. The disclosed process comprises the steps of forming an admixture of the copolymer, monomer, and 25 to 3,000 ppm of an organic peroxide having a half-life of about one minute to about 120 minutes at 150° C., and mixing the resultant admixture in an extruder at a temperature above the melting point of the copolymer for a period of time at least four times the half-life of the organic peroxide. The resultant grafted copolymer is then extruded into a shaped article.

U.S. Pat. No. 5,106,916 discloses a process for the catalytic grafting of an ethylenically unsaturated monomer onto a copolymer in which the process of EPA 0 266 994 is modified by the addition of a catalyst comprising water and at least one phosphorous-containing compound selected from the group consisting of compounds of formula HPO$(OR_1)_2$, phosphite compounds of formula $P(OR_2)_3$ and formula $(OR_3)P$—O—$R_4$—O—$P(OR_5)_2$, and di-substituted pentaerythritol diphosphites of formula $(R_6O)P$—$O_2$—$R_{PE}O_2$—$P(OR_7)$, where $O_2R_{PE}O_2$ is the pentaerythritol moiety, and $R_1$–$R_7$ are specified organic functional groups.

Grafted metallocene-catalyzed polymers, which are available commercially, share the advantages of non-grafted metallocene-catalyzed polymers, including a narrow molecular weight distribution and uniform molecular architecture. The addition of functional groups to the metallocene-catalyzed polymers by grafting allows polymers to be produced having properties that are not available with unfunctionalized metallocene-catalyzed polymers or polymers formed without the use of metallocene catalysts.

While different blend combinations of species of one variety of polymer, such as ionomers, have been successfully used in the prior art, different polymers, such as ionomers and balata or other non-ionic polymers have not been successfully blended for use in golf ball covers. In general, prior art blends of polymer components are immiscible, i.e., heterogeneous on a microscopic scale, and incompatible, i.e., heterogeneous on a macroscopic scale, unless strong interactions are present between the polymer components in the mixture, such as those observed between ionomers and polymers containing carboxylic acid groups. In particular, this lack of compatibility exists when an ionomer is blended with a polyolefin homopolymer, copolymer, or terpolymer that does not contain ionic, acidic, basic, or other polar pendant groups, and is not produced with a metallocene catalyst. These mixtures often have poor tensile strength, impact strength, and the like. Hence, the golf balls produced from these incompatible mixtures will have inferior golf ball properties such as poor durability, cut resistance, and so on. In contrast, a compatible blend may be heterogeneous on a microscopic scale, but is homogeneous on a macroscopic scale, and, thus, has useful golf ball properties.

In this regard, U.S. Pat. No. 5,397,840 discloses golf ball covers including a blend of "ionic copolymers" and "non-ionic copolymers". However, the "ionic copolymers" are defined as copolymers of an α-olefin and a metal salt of an α,β-unsaturated carboxylic acid, and the "non-ionic copolymers" are copolymers or terpolymers containing ethylene or propylene and acrylic or methacrylic acid monomers. Therefore, strong interactions exist between the metal salts of the "ionic copolymers" and the acrylic or methacrylic acid monomers of the "non-ionic copolymers" that allow compatible blends to be formed. These interactions do not exist in prior art blends of ionomers and polymers that are truly non-ionic or nonpolar, in particular, those polymers produced with a process that does not involve the use of a metallocene catalyst.

U.S. Pat. Nos. 4,986,545; 5,098,105; 5,187,013; 5,330,837; and 5,338,610 disclose golf balls having covers comprising blends of ionomers and modified thermoplastic elastomers, where the thermoplastic elastomers are conventional polymers, i.e., polymers polymerized using catalysts other than metallocene catalysts. The modified polymers include maleic anhydride modified ethylene-propylene copolymers, maleic anhydride modified styrenic block copolymers, maleic anhydride modified ethylene-vinyl acetate copolymers, brominated styrene-isobutylene copolymers, amine modified ethylene-propylene rubber, and polar modified para-methylstyrene-isobutylene copolymers. However, blends of ionomers with modified polyolefins are not exemplified. Although the disclosed balls are said to exhibit enhanced playability, i.e., softness and spin, without sacrificing coefficient of restitution and, thus, carrying distance, all of the exemplified balls have a Riehle Compression in the range of 61 to 43. Therefore, even though the disclosed cover materials may be relatively soft, each of the disclosed balls has an extremely high compression, and, thus, would be expected to have a high coefficient of restitution.

U.S. Pat. Nos. 5,397,840 and 5,516,847 are directed to golf ball covers comprising a blend of copolymers wherein one or more of the copolymers is a nonionic copolymer, such as a copolymer of ethylene and acrylic acid or methacrylic acid or a copolymer of propylene and acrylic acid, and one or more of the copolymers is an ionic copolymer, such as sodium and zinc neutralized copolymers of ethylene and acrylic acid.

U.S. Pat. Nos. 5,542,677 and 5,591,803 are directed to golfball cover compositions containing blends of high or low carboxylic acid based copolymers and ethylene copolymers such as ethylene alkyl acrylates.

U.S. Pat. No. 5,321,089 is directed to a golf ball cover composition comprising a blend of ethylene-methyl acrylate, an ionomer resin, and a compatibilizer.

As shown in U.S. Pat. No. 5,703,166, metallocene-catalyzed polymers and ionomers form compatible blends of useful golf ball properties. However, there is no known prior art disclosure of golf balls incorporating compositions comprising grafted metallocene-catalyzed polymers.

U.S. Pat. No. 5,981,658 discloses golfball compositions that contain non-ionic olefinic copolymers produced by metallocene catalysts functionalized with a post-polymerization reaction. The disclosed compositions exhibit improved mechanical properties, such as tensile strength and flexural modulus. The polymers disclosed in the '658 patent do not, however, address problems with processability of these types of polymers.

There is, however, a need in the golf ball art for a golf ball incorporating grafted metallocene-catalyzed polymers and blends of grafted metallocene-catalyzed polymers and other polymers, such as ionomers and non-ionomers, in golf balls, such that the processability of the polymer composition is enhanced because of the resultant increase in melt flow index. Further, the inclusion of foamed and unfoamed grafted metallocene-catalyzed polymers and grafted metallocene-catalyzed polymer blends with certain ionomers and non-ionomers will allow highly durable golf balls to be produced with improved performance and virtually any combination of feel and spin rate.

SUMMARY OF THE INVENTION

The present invention is directed to A golf ball comprising a core and a cover, wherein at least one of the cover or the core is formed from a polymer blend comprising at least one grafted metallocene-catalyzed polymer, at least one ionomer, and at least one non-ionomer.

In one embodiment, the golf ball comprises a cover having at least one of a dimple coverage of greater than about 60 percent, a hardness from about 35 to 80 Shore D, or a flexural modulus of greater than about 500 psi, and wherein the golf ball has at least one of a compression from about 50 to 120 or a coefficient of restitution of greater than about 0.7.

In a preferred embodiment, the grafted metallocene-catalyzed polymer has a flexural modulus of from about 500 psi to about 100,000 psi, the ionomer has a flexural modulus of from about 1,000 psi to about 200,000 psi, and the non-ionomer has a flexural modulus of from about 500 psi to about 100,000 psi. In one embodiment, the cover comprises the polymer blend. In another embodiment, the cover layer has a Shore D hardness of less than about 75. In another embodiment, the cover layer has a thickness of from about 0.015 to about 0.125 in. Instill another embodiment, the grafted metallocene-catalyzed polymer has been functionalized by grafting an ethylenically-unsaturated monomer onto the at least one metallocene-catalyzed polymer using a post-polymerization reaction. Preferably, the ethylenically-unsaturated monomer is an olefinic monomer having a functional group selected from the group consisting of sulfonic acid, sulfonic acid derivatives, chlorosulfonic acid, vinyl ethers, vinyl esters, primary amines, secondary amines, tertiary amines, mono-carboxylic acids, dicarboxylic acids, partially or fully ester derivatized mono-carboxylic acids, partially or fully ester derivatized dicarboxylic acids, anhydrides of dicarboxylic acids, cyclic imides of dicarboxylic acids, and ionomeric derivatives thereof, and combinations thereof. More preferably, the ethylenically-unsaturated monomer comprises maleic anhydride.

In another embodiment, the at least one grafted metallocene-catalyzed polymer is present in an amount of from about 5 to about 50 phr. Preferably, the at least one grafted metallocene-catalyzed polymer is present in an amount of from about 5 to about 30 phr. In still another embodiment, the at least one ionomer is present in an amount of from about 95 to about 50 phr. In a preferred embodiment, the at least one ionomer is present in an amount of from about 95 to about 70 phr. In an alternative embodiment, the at least one non-ionomer is present in an amount of from about 1 to about 25 phr. Preferably, the at least one non-ionomer is present in an amount of from about 5 to about 20 phr.

In one embodiment, the core comprises the polymer blend of the present invention. In an alternative embodiment, the core comprises a center and at least one mantle layer disposed between the center and the cover. The at least one mantle layer may comprise the polymer blend while the cover comprises a thermoset or thermoplastic material. Additionally, the cover may comprise the polymer blend and a thermoplastic material. The thermoplastic material may comprise at least one ionomer. Preferred thermoset materials, if used, include polyureas, polyurethanes, and mixtures thereof.

In yet another embodiment, at least one of the core, cover, or mantle layer comprises a density-adjusting filler. The density-adjusting filler preferably comprises zinc oxide, barium sulfate, silica, calcium carbonate, zinc carbonate, tungsten, titanium, and mixtures thereof. In another embodiment, the at least one mantle layer comprises the polymer blend of the present invention. In one embodiment, the center is fluid-filled and, alternatively, in another embodiment, the center is a solid or hollow center. In still another embodiment, the at least one mantle layer comprises a tensioned elastomeric thread disposed about a fluid-filled center or a solid center.

In one embodiment, the grafted metallocene-catalyzed polymer is formed by grafting an ethylenically-unsaturated monomer onto a metallocene-catalyzed polymer selected from the group consisting of polyethylene and copolymers of ethylene with propylene, butene, pentene, hexene, heptene, octene, and norbornene. In another embodiment, the grafted metallocene-catalyzed polymer is formed by grafting an ethylenically-unsaturated monomer onto a metallocene-catalyzed polymer selected from the group consisting of polyethylene and copolymers of ethylene with butene. In a preferred embodiment, the grafted metallocene-catalyzed polymer is formed by grafting an ethylenically-unsaturated monomer onto a metallocene-catalyzed polymer of the formula:

wherein $R_1$ is hydrogen; $R_2$ is hydrogen or lower alkyl selected from the group consisting of $CH_3$, $C_2H_5$, $C_3H_7$, $C_4H_9$, and $C_5H_{11}$; $R_3$ is hydrogen or lower alkyl selected from the group consisting of $CH_3$, $C_2H_5$, $C_3H_7$, $C_4H_9$, and $C_5H_{11}$; $R_4$ is selected from the group consisting of H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, and phenyl, in which from 1 to 5 H and $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring; $R_5$ is hydrogen, lower alkyl including $C_1$–$C_5$, carbocyclic, aromatic or heterocyclic; $R_6$ is hydrogen, lower alkyl including $C_1$–$C_5$, carbocyclic, aromatic or heterocyclic; and wherein x ranges from 99 to 50 weight per cent of the polymer, y ranges from 1 to 50 weight per cent of the polymer and z ranges from 0 to 49 weight per cent of the polymer.

In one embodiment, the polymer blend has a foamed structure. In another embodiment, the non-ionomeric polymer has the chemical structure:

wherein x=50 to 99 weight %; y=1 to 50 weight %; z=0 to 49 weight %; $R_1$=H or $CH_3$; $R_2$=methyl, ethyl, propyl, butyl, pentyl, hexyl, hectyl, octyl, or isobomyl; and n=0 to 12. In yet another embodiment, the non-ionomer comprises an olefinic homopolymer, an olefinic copolymer, an olefinic terpolymer, and mixtures thereof. Preferably, the non-ionomer is an acid-containing ethylene copolymer comprising ethylene/methacrylic acid, ethylene/acrylic acid, and mixtures thereof In another embodiment, the non-ionomer is an acid-containing ethylene terpolymer comprising ethylene/acrylic acid/n- or isobutyl acrylate, ethylene/methacrylic acid/n- or iso-butyl acrylate, ethylene/acrylic acid/methyl acrylate, ethylene/methacrylic acid/methyl acrylate, ethylene/acrylic acid/iso-bomyl acrylate or methacrylate, ethylene/methacrylic acid/isobomyl acrylate or methacrylate, and mixtures thereof It is preferred that the non-ionomer is present in an amount from about 1 phr to about 25 phr of the total polymer. In an alternative embodiment, the polymer blend further comprises a non-grafted metallocene catalyzed copolymer. Preferably, the non-grafted metallocene catalyzed copolymer comprises polyolefin plastomers, polyolefin elastomers, or a mixture thereof.

The present invention is also directed to a golf ball comprising a core having a center, a cover, and at least one mantle layer disposed between the core and the cover, wherein at least one of the cover, the center, and the at least one mantle layer is formed from a polymer blend comprising from about 5 to about 50 phr of at least one grafted metallocene-catalyzed polymer, from about 95 to about 50 phr of at least one ionomer, and from about 1 to about 25 phr of at least one non-ionomer.

The present invention is also directed to a golf ball comprising a core having a center, a cover, and at least one mantle layer disposed between the core and the cover, wherein at least one of the cover, the center, and the at least one mantle layer is formed from a polymer blend comprising from about 5 to about 50 phr of at least one grafted metallocene-catalyzed polymer formed by grafting an ethylenically-unsaturated monomer onto a metallocene-catalyzed polymer selected from the group consisting of polyethylene and copolymers of ethylene and butene; from about 95 to about 50 phr of at least two ionomers, each comprising an ethylene methacrylic/acrylic acid copolymer wherein at least one ionomer is partially neutralized with lithium and at least one ionomer is partially neutralized with sodium; and from about 1 to about 25 phr of at least one non-ionomer of the chemical structure:

wherein x=50 to 99%; y=1 to 50%; z=0 to 49%; $R_1$=H or $CH_3$; $R_2$=methyl, ethyl, propyl, butyl, pentyl, hexyl, hectyl, octyl, and isobornyl; and n=0 to 12.

DEFINITIONS

As used herein, the term "metallocene-catalyzed polymer" refers to any polymer, copolymer, or terpolymer, and, in particular, any polyolefin, polymerized using a metallocene catalyst. The term "metallocene-catalyzed polymer blend" refers to any blend of a metallocene-catalyzed polymer and any other type of polymer, preferably an ionomer.

The terms "grafted metallocene-catalyzed polymer" and "grafted metallocene-catalyzed polymer blend" refer to any metallocene-catalyzed polymer or metallocene-catalyzed polymer blend in which the metallocene-catalyzed polymer has been subjected to a post-polymerization reaction to graft at least one functional group onto the metallocene-catalyzed polymer. A "post-polymerization reaction" is any reaction that occurs after the formation of the polymer by polymerization.

As used herein, the term "layer" includes any generally spherical portion of a golf ball or golf ball core, center, mantle, or cover, including a one-piece ball. A "mantle" is defined herein as a portion of the golf ball that occupies a volume between the cover and the core. Of course, as one of ordinary skill in the art would recognize, any of the core, cover, and mantle of the golf balls of the invention can be formed of one layer or a plurality of layers, as that term is defined herein.

As used herein, the term "fluid" includes a liquid, a paste, a gel, a gas, or any combination thereof.

As used herein, the term "compatible" with regard to a polymer blend refers to a blend of two or more polymers, having useful golf ball properties, that is homogeneous on a macroscopic scale. Compatible blends may be miscible, i.e., homogeneous on a microscopic scale, or at least partially immiscible, i.e., heterogeneous on a microscopic scale. The term "incompatible" refers to a mixture of at least two polymers that is heterogeneous on both a microscopic scale and a macroscopic scale, such that useful golf ball properties, such as durability, are lacking.

As used herein, the term "non-ionomer" refers to any non-ionomeric polymer, excluding the grafted metallocene-catalyzed polymers of the present invention.

DETAILED DESCRIPTION OF THE INVENTION

The present invention relates to golf balls including at least one foamed or unfoamed layer that comprises one or more grafted metallocene-catalyzed polymers. As noted above, the layer may be in any of the core or the cover. In one embodiment, the core comprises a center and at least one mantle layer situated between the center and the cover. The grafted metallocene-catalyzed polymer may be blended with other types of polymers, such as non-grafted metallocene-catalyzed polymers, ionomers, non-ionomers, and thermoplastic elastomers. Preferably, the grafted metallocene-catalyzed polymer is blended with at least one ionomer and at least one non-ionomer.

Grafted metallocene-catalyzed polymer blends useful in the invention typically comprise a compatible blend of about 1 to about 75 parts per hundred ("phr") of the total polymer blend of at least one grafted metallocene-catalyzed polymer, about 99 to about 25 phr of at least one ionomer, and about 1 to about 70 phr of at least one non-ionomer. Preferably, the blends of the present invention comprise from about 5 to about 50 phr of at least one grafted metallocene-catalyzed polymer, about 95 to about 50 phr of at least one ionomer, and about 1 to about 40 phr of at least one non-ionomer. More preferably, the blends of the present invention comprise from about 10 to about 30 phr of at least one grafted metallocene-catalyzed polymer, about 90 to about 70 phr of at least one ionomer, and about 1 to about 20 phr of at least one non-ionomer. Most preferably from about 15 to about 25 phr of at least one grafted metallocene-catalyzed polymer and about to about 75 phr of at least one ionomer, and about 1 to about 10 phr of at least one non-ionomer. Where the layer is foamed, the grafted metallocene-catalyzed polymer blends may be foamed during molding by any conventional foaming or blowing agent.

Grafted metallocene-catalyzed polymers and polymer blends may be thermoformed and, thus, can be either compression or injection molded to form a layer of foamed or unfoamed grafted metallocene-catalyzed polymer in the cover, center, or at least one mantle layer, if present, of a golf ball according to the invention. Grafted metallocene-catalyzed polymers and grafted metallocene-catalyzed polymer blends are resilient, easily processed materials that are less expensive than ionomers, and allow highly durable golf balls to be produced with improved performance and virtually any combination of feel and spin rate.

Golf balls according to the invention may incorporate cores comprising grafted metal locene-catalyzed polymers or polymer blends, non-grafted metallocene-catalyzed polymers or polymer blends, or conventional materials. Cores comprising at least one grafted metallocene-catalyzed polymer or polymer blend may be either one-piece, comprising a single piece of foamed or unfoamed grafted metal locene-catalyzed polymer or polymer blend, or multi-piece, comprising a fluid, hollow, or solid center and one or more mantle layers in which any of the center or at least one of the layers comprises a foamed or unfoamed grafted metallocene-catalyzed polymer, at least one ionomer and at least one non-ionomer, or polymer blend.

Figure 1:
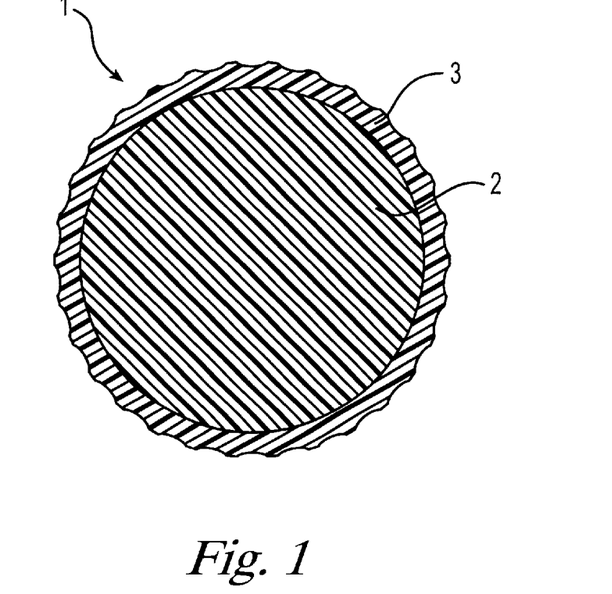
FIG. 1 is a cross-sectional view of a two-piece golf ball according to the invention with a cover and a core.

For example, FIG. 1 illustrates a golf ball according to the invention with a one-piece core. Golf ball 1 comprises a core 2 and a cover 3, wherein either of core 2 or cover 3 incorporates at least one layer comprising a foamed or unfoamed grafted metallocene-catalyzed blend.

Figure 2:
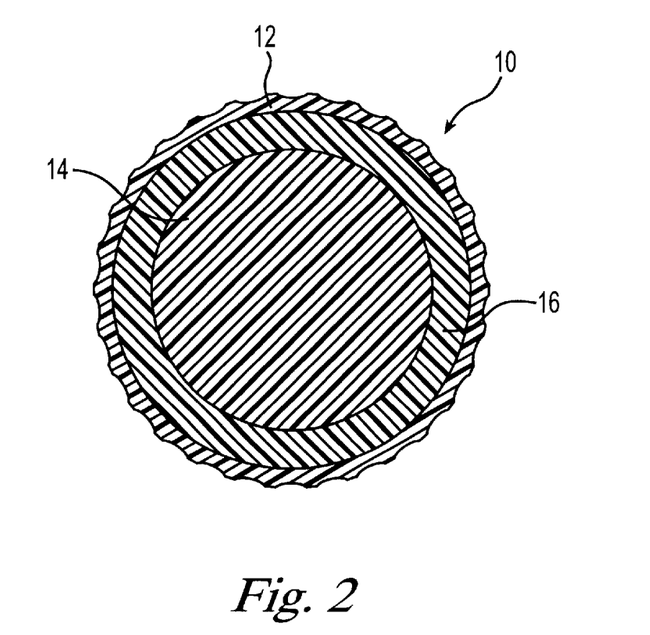
FIG. 2 is a cross-sectional view of a golf ball according to the invention incorporating a multi-layer core.

Similarly, FIG. 2 illustrates a golf ball according to the invention incorporating a multi-piece core. Golf ball 10 comprises a cover 12 and a core having a center 14 and at least one mantle layer 16. Any of the cover 12, center 14, or mantle layer 16 may incorporate at least one layer of a foamed or unfoamed grafted metallocene-catalyzed blend. It should be understood that a center and any mantle layers are typically referred to herein as a "core".

Conventional materials useful in forming centers or mantles of the golf balls of the invention include, but are not limited to, compositions having a base rubber, a crosslinking agent, a free radical initiator, and a density-adjusting filler. The base rubber typically includes natural or synthetic rubbers. A preferred base rubber is 1,4-polybutadiene having at least about 40% of a cis-structure. Natural rubber, polyisoprene rubber and/or styrene-butadiene rubber may be optionally used in place of or added to the 1,4-polybutadiene. Crosslinking agents include metal salts of unsaturated fatty acids, such as zinc or magnesium salts acrylic or methacrylic acid. The density-adjusting filler typically includes materials such as zinc oxide, barium sulfate, silica, calcium carbonate, zinc carbonate, tungsten, titanium, and the like.

Figure 3:
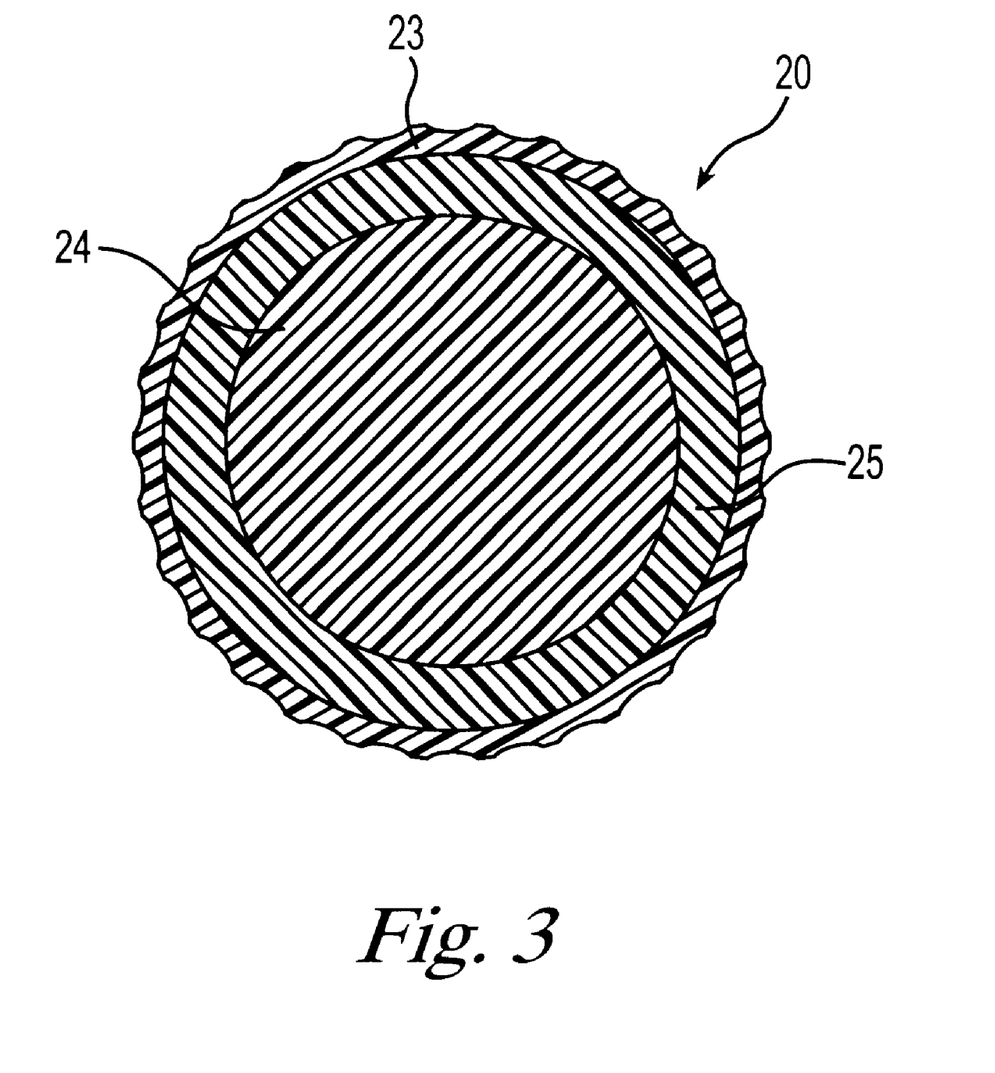
FIG. 3 is a cross-sectional view of a golf ball according to the invention incorporating a mantle layer between the cover and the center.

Golf balls of the invention may also include a mantle layer situated between the cover and the center. In one preferred embodiment, the mantle layer comprises a least one layer of a foamed or unfoamed grafted metallocene-catalyzed polymer or polymer blend, but may also be formed from a non-grafted metallocene-catalyzed polymer or polymer blend or from any other suitable polymeric material having the desired properties. A golf ball incorporating a mantle layer is illustrated in FIG. 3, which depicts golf ball 20, having cover 23, center 24, and a mantle layer 25 situated between the cover and the center 24. Any of cover 23, center 24, and mantle layer 25 may incorporate at least one layer of a foamed or unfoamed grafted metallocene-catalyzed polymer or polymer blend, at least one ionomer, and at least one non-ionomer. Moreover, the core may be a one-piece core, a multi-layer core, or a wound core, having a solid or liquid center. Indeed, golf balls of the invention may also have conventional wound cores, i.e., have a center with at least one mantle layer including a tensioned elastomeric thread.

Thread with different material properties, dimensions, cross-sectional shapes, and methods of manufacturing the thread may be used for any wound layer present in the ball. The material properties of the thread that can be varied include ultimate or maximum elongation and tensile modulus. For example, the thread may be formed from fiber, glass, carbon, or a variety of polymeric materials. Suitable polymers include polyether urea, such as LYCRA®, polyester urea, polyester block copolymers, such as HYTREL®, isotactic-poly(propylene), polyethylene, polyamide, polyketone, poly(ethylene terephthalate), such as DACRON®, poly(p-phenylene terephthalamide), such as KEVLAR®, poly(acrylonitrile), such as ORLON®, copolymers of diaminodicyclohexylmethane and dodecanedicarboxylic acid, such as QUINA®, all of which are commercially available from E.I. DuPont de Nemours & Co. of Wilmington, Del. Other suitable thread materials include cis-polyisoprene rubber, preferably at least about 60% of a blend of two synthetic cis-1,4 polyisoprene rubbers, and about less than 40% of a natural rubber. It is preferred that the synthetic cis-1,4 polyisoprene rubbers have a cis-1,4 content of at least 90%, however the cis-1,4 contents may vary for each rubber. Preferred threads are elastomeric, while graphite thread tends to be less preferred than other available thread types due to the difficulty in placing such threads under tension when being wound about a center.

Golf balls according to the invention may also incorporate cover layers comprising foamed or unfoamed grafted metallocene-catalyzed polymers or polymer blends, non-grafted metallocene-catalyzed polymers or polymer blends, or conventional materials, including balata and ionomer cover stock. Grafted metallocene-catalyzed polymer blend cover layers according to the invention may be used with conventional solid or wound cores, as well as those comprising grafted or non-grafted metallocene-catalyzed polymers or polymer blends. In another preferred embodiment, the cover of a golf ball according to the invention is formed from a blend comprising at least one grafted metallocene-catalyzed polymer, at least one ionomer, and at least one non-ionomer.

The narrow molecular weight distributions of metallocene-catalyzed polymers provide more uniform compositions and improved mechanical properties when compared to polyolefins polymerized with conventional catalysts. In addition, when the metallocene-catalyzed polymer is modified by a post-polymerization reaction to add at least one pendant functional group to the metallocene-catalyzed polymer, the compatibility of the resulting grafted metallocene-catalyzed polymer with other polymers, and with ionomers in particular, is improved. As a result, blends of grafted metallocene-catalyzed polymers, ionomers, and non-ionomers have superior golf ball properties, including performance and durability. For example, as demonstrated in the examples below, a compatible blend of a grafted metallocene-catalyzed polymer, an ionomer, and a non-ionomer results in a golf ball cover composition that provides increased softness ("feel") without losing resilience or distance (for a given cover hardness), when compared to covers comprising a blend of a grafted metallocene-catalyzed polymer and an ionomer. Additionally, golf balls constructed with the cover blends of the present invention exhibit increased control, in part due to decreased driver spin and increased wedge spin.

When a layer of foamed or unfoamed metallocene-catalyzed polymer or polymer blend is used in a golf ball cover or mantle, the ball has a softer feel than a ball made using a hard ionomer. Moreover, when the layer in the cover or the mantle comprises a grafted metallocene-catalyzed polymer or polymer blend, the performance of the resulting golf ball, in particular, the initial velocity, is also significantly improved.

The use of foamed grafted metallocene-catalyzed polymer also allows the golf ball designer to adjust the density or mass distribution of the ball to adjust the angular moment of inertia, and, thus, the spin rate and performance of the ball. Foamed materials also offer a potential cost savings due to the reduced use of polymeric material.

Grafted metallocene-catalyzed polymers useful in the golf balls of the invention are available in experimental quantities from DuPont under the tradenames SURLYN® NMO 525D, SURLYN® NMO 524D, and SURYN® NMO 499D, all formerly known as the FUSABOND® family of polymers, or may be obtained by subjecting a non-grafted metallocene-catalyzed polymer to a post-polymerization reaction to provide a grafted metallocene-catalyzed polymer with the desired pendant group or groups. Examples of metallocene-catalyzed polymers to which functional groups may be grafted for use in the invention include, but are not limited to, homopolymers of ethylene and copolymers of ethylene and a second olefin, preferably, propylene, butene, pentene, hexene, heptene, octene, and norbornene, more preferably, butene, pentene, hexene, heptene, octene, and norbomene, and most preferably butene. Generally, the invention includes golf balls having at least one layer comprising at least one grafted metallocene-catalyzed polymer or polymer blend, where the grafted metallocene-catalyzed polymer is produced by grafting a functional group onto a metallocene-catalyzed polymer having the formula:

wherein
R$_1$ is hydrogen, branched or straight chain alkyl such as methyl, ethyl, propyl, butyl, pentyl, hexyl, heptyl, and octyl, carbocyclic, aromatic or heterocyclic;
R$_2$ is hydrogen, lower alkyl including C$_1$–C$_5$; carbocyclic, aromatic or heterocyclic
R$_3$ is hydrogen, lower alkyl including C$_1$–C$_5$, carbocyclic, aromatic or heterocyclic;
R$_4$ is selected from the group consisting of H, C$_n$H$_{2n-1}$, where n=1 to 18, and phenyl, in which from 0 to 5 H within R$_4$ can be replaced by substituents selected from the group consisting of COOH, SO$_3$H, NH$_2$, F, Cl, Br, I, OH, SH, silicone, lower alkyl esters and lower alkyl ethers, with the proviso that R$_3$ and R$_4$ can be combined to form a bicyclic ring;
R$_5$ is hydrogen, lower alkyl including C$_1$–C$_5$, carbocyclic, aromatic or heterocyclic;
R$_6$ is hydrogen, lower alkyl including C$_1$–C$_5$, carbocyclic, aromatic or heterocyclic; and
wherein x, y and z are the relative percentages of each co-monomer. The number x can range from 1–99 percent or more preferably from 10–70 percent and most preferred, from about 10–50 percent. The number y can be from 99–1 percent, preferably, from 90–30 percent, or most preferably, 90–50 percent. The number z can range from 0 to 49 percent.

Preferably, the preferred grafted metallocene-catalyzed polymer is formed by grafting a functional group onto a metallocene-catalyzed polyethylene or a metallocene-catalyzed polymer of the formula given above in which R$_1$ is hydrogen or lower alkenyl, R$_2$ is hydrogen or alkyl, including carbon chains having from 1 to 10 carbon atoms, R$_3$ is hydrogen or lower alkyl or alkenyl such as carbon chains having 1–10 carbon atoms, and R$_4$ is a lower alkyl group having from 1–10 carbon atoms. For terpolymers, where z is not zero, R$_5$ is preferably hydrogen or lower alkyl or alkenyl such as carbon chains having 1–10 carbon atoms, and R$_6$ is a lower alkyl group having from 1–10 carbon atoms. In the most preferred copolymer, R$_1$ and R$_2$ are hydrogen, R$_3$ is hydrogen, methyl, ethyl, propyl, butyl, pentyl, hexyl, heptyl or octyl, and R$_4$ is a straight carbon chain having 6 carbon atoms. For terpolymers, R$_5$ is most preferably hydrogen, methyl, ethyl, propyl, butyl, pentyl, hexyl, heptyl or octyl, and R$_6$ is a straight carbon chain having 6 carbon atoms.

Metallocene-catalyzed copolymers or terpolymers can be random or block copolymers or terpolymers, and may be isotactic, syndiotactic or atactic. The pendant groups creating the isotactic, syndiotactic or atactic polymers are chosen to determine the interactions between the different polymer chains making up the resin to control the final properties of the resins used in golf ball covers, centers, or mantles. As will be clear to those skilled in the art, grafted metallocene-catalyzed polymers useful in the invention that are formed from metallocene-catalyzed random or block copolymers or terpolymers will also be random or block copolymers or terpolymers, and will have the same tacticity of the metallocene-catalyzed polymer backbone.

As used herein, the term "phrase branched or straight chain alkyl" means any substituted or unsubstituted acyclic carbon-containing compounds, including alkanes, alkenes and alkynes. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, butylene, pentene, hexene, heptene, octene, norbornene, nonene, decene and the like. The ordinary skilled artisan is familiar with numerous linear and branched alkyl groups, all of which are within the scope of the present invention.

In addition, such alkyl groups may also contain various substituents in which one or more hydrogen atoms has been replaced by a functional group. Functional groups include, but are not limited to hydroxyl, amino, carboxyl, sulfonic amide, ester, ether, phosphates, thiol, nitro, silane and halogen (fluorine, chlorine, bromine and iodine), to mention but a few.

As used herein, the term "substituted and unsubstituted carbocyclic" means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As used herein, the term "substituted and unsubstituted aryl groups" includes, but is not limited to, phenyl, naphthyl, anisyl, toluyl, xylenyl and the like. According to the present invention, aryl also includes heteroaryl groups, e.g., pyrimidine or thiophene. These aryl groups may also be substituted with any number of a variety of functional groups. In addition to the functional groups described above in connection with substituted alkyl groups and carbocyclic groups, functional groups on the aryl groups can include nitro groups.

As mentioned above, R$_1$ and R$_2$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, 2,2-methylphenylbutyl.

Non-grafted metallocene-catalyzed polymers useful in the present invention are commercially available under the trade name AFFINITY® polyolefin plastomers and ENGAGE® polyolefin elastomers commercially available from Dow Chemical Company and DuPont-Dow of Michigan. Other commercially available metallocene-catalyzed polymers can be used such as Exxon's EXACT® and Dow's INSIGHT® line of resins which have superior flexibility and clarity as well as toughness. The EXACT® and INSIGHT® line of polymers also have novel rheological behavior in addition to their other properties as a result of using a metallocene catalyst technology. Metallocene-catalyzed polymers are also readily available from Sentinel Products Corporation of Hyannis, Mass., as foamed sheets for compression molding. The foamed grafted metallocene-catalyzed polymers sheets are available in thicknesses ranging from about 0.027 to 0.625 inches. Closed cell bun stock is also available in thicknesses of up to 4 inches.

Grafted metallocene-catalyzed polymers functionalized with pendant groups, such as maleic anhydride and the like, are commercially available from E.I. DuPont de Nemours and Co., Inc of Wilmington, Del., and include, for example, SURLYN® NMO 525D, SURLYN® NMO 524D, and SURLYN® NMO 499D, formerly known as the FUSAB-OND® family of polymers.

In addition, grafted metallocene-catalyzed polymers may be formed from commercially available metallocene-catalyzed polymers using post-polymerization reactions known in the art. For example, the grafted metallocene-catalyzed polymers may be formed using the method disclosed in EPA 0 266 994 by admixing a metallocene-catalyzed polymer with a monomer capable of bonding to the metallocene-catalyzed polymer and an organic peroxide, and mixing the admixture at a temperature greater than the melting point of the metallocene-catalyzed polymer for a time sufficient for the post-polymerization reaction to occur. Typically, the mixing is continued for at least four times the half-life of the organic peroxide. Although the monomer, metallocene-catalyzed polymer, and the peroxide may be added in any order, preferably, the metallocene-catalyzed polymer and monomer are thoroughly mixed before the peroxide is added.

Monomers useful in the present invention include, but are not limited to olefinic monomers having, as a functional group, sulfonic acid, sulfonic acid derivatives, such as chlorosulfonic acid, vinyl ethers, vinyl esters, primary, secondary, and tertiary amines, mono-carboxylic acids, dicarboxylic acids, partially or fully ester derivatized mono-carboxylic acids and dicarboxylic acids, and anhydrides of dicarboxylic acids, and cyclic imides of dicarboxylic acids. In polyethylene, the post-polymerization reaction results in the substitution of the monomer for a hydrogen on the polymer backbone. Because all of the secondary hydrogen atoms are equivalent in polyethylene, the pendant group may replace any of the secondary hydrogens on the polymer. In copolymers and polymers of olefins other than ethylene, which contain both secondary and tertiary hydrogens, the tertiary hydrogens are more labile, and, thus, the reaction occurs substantially exclusively at the site of the tertiary hydrogens.

In addition, metallocene-catalyzed polymers may also be functionalized by sulfonation, carboxylation, or the addition of an amine or hydroxy group. Metallocene-catalyzed polymers functionalized by sulfonation, carboxylation, or the addition of a hydroxy group may be converted to anionic ionomers by treatment with a base. Similarly, metallocene-catalyzed polymers functionalized by the addition of an amine may be converted to cationic ionomers by treatment with an alkyl halide, acid, or acid derivative.

The most preferred monomer is maleic anhydride, which, once attached to the metallocene-catalyzed polymer by the post-polymerization reaction, may be further subjected to any reaction to which an anhydride may be subject to form a grafted metallocene-catalyzed polymer containing other pendant or functional groups. For example, reaction with water will convert the anhydride to a dicarboxylic acid, reaction with ammonia forms an amide, reaction with an alcohol results in the formation of an ester, and reaction with base results in the formation of an anionic ionomer.

In particular, maleic anhydride, which has the formula may be grafted onto a metallocene-catalyzed polymer by means of a post-polymerization reaction, as described above. The maleic anhydride will graft onto a metallocene-catalyzed polymer of formula to form a grafted metallocene-catalyzed polymer of formula

Where R is not H, the monomer being grafted to the metallocene-catalyzed polymer will always replace the tertiary H because the tertiary H is more labile than the secondary H. Clearly, in polyethylene, where every H is a secondary H, the monomer must replace a secondary H. Where the monomer is a maleic anhydride, the resulting grafted metallocene-catalyzed polymer may be reacted with water to form which may be further reacted with a base of formula MOH to form an ionomer of formula formula or formula or reacted with a base of formula $M(OH)_2$ to form an ionomer of formula A maleic anhydride grafted metallocene-catalyzed polymer may also be reacted with ammonia to form It has been discovered that maleic anhydride grafted metallocene-catalyzed polymers are formed of highly compatible blends with ionomers and other thermoplastic polymers.

In addition, unsaturated carboxylic acids, such as methacrylic and acrylic acid, can be grafted to a metallocene-catalyzed polymer to form which may be reacted with a base to form an ionomer. Sulfur compounds, such as $H_2SO_4$, $ClSO_3H$, or $SO_3$, when grafted to a metallocene-catalyzed polymer will form polymers of formula

Grafting a vinyl ester of formula $CH_2=CH-COOR$ gives polymers of formula and a primary or secondary amine or other suitable nitrogen compound provides polymers of formula If a monomer of formula is used, the resulting grafted metallocene-catalyzed polymer of formula may be reacted with an acid or acid derivative or a compound of formula $R^+X^-$, where R may be a linear or branched alkyl group having from 1 to 12 carbon atoms, and X may be a halide, to form a cationic ionomer.

The grafted metallocene-catalyzed polymer blend golf ball compositions of the present invention comprise compatible blends of at least one grafted metallocene-catalyzed polymer, at least one ionomer, and at least one non-ionomer. Blends useful in the golf ball of the invention may be formed using blending methods well known in the art. In particular, the grafted metallocene-catalyzed polymer blends comprise compatible blends of grafted metallocene-catalyzed polymers, ionomers, such as ethylene methacrylic acid ionomers and ethylene acrylic acid ionomers, and their terpolymers, sold commercially under the tradenames SUR-LYN® and IOTEK® by DuPont and Exxon, respectively, and non-ionomers, such as NUCRELO® also sold commercially by DuPont.

The grafted metallocene-catalyzed polymers useful in the golf balls of the invention can also be blended with non-grafted metallocene-catalyzed polymers and other non-ionomeric polymers, such as poly(ethylethylene), poly(heptylethylene), poly(hexyldecylethylene), poly(isopentylethylene), poly(1,1-dimethyltrimethylene), poly(1,1,2-trimethyltrimethylene), poly(butyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly(methoxyethylene), poly (pentyloxyethylene), poly(1,1-dichloroethylene), poly (cyclopentylacetoxyethylene), poly(4-[(2-butoxyethoxy) methyl]styrene), poly(4-dodecylstyrene), poly(4-tetradecylstyrene), poly(phenylmethylethylene), poly[oxy (ethoxymethyl)ethylene], poly(oxyethylethylene), poly (oxytetramethylene), poly(oxytrimethylene), poly (oxycarbonylpentamethylene), poly(oxycarbonyl-3-methylpentamethylene), poly(oxycarbonyl-1,5-dimethylpentamethylene), poly(silanes) and poly(silazanes), main-chain heterocyclic polymers, polyurethanes, polyamides, polyimides, polyesters, polyethers, and polycarbonates, polyketones, poly(trimethylene terepthalate) ("PTT"), polyphenylene ether, poly(butylene terepthalate), or a combination thereof, as well as the classes of polymers to which they belong.

Any non-ionomeric polymer available to one of ordinary skill in the art may be included in the blends according to the invention. Preferred non-ionomeric polymers include acid-containing ethylene copolymers, such as ethylene/acrylic acid; ethylene/methacrylic acid; ethylene/acrylic acid/n- or isobutyl acrylate; ethylene/methacrylic acid/n- or iso-butyl acrylate; ethylene/acrylic acid/methyl acrylate; ethylene/ methacrylic acid/methyl acrylate; ethylene/acrylic acid/iso-bornyl acrylate or methacrylate and ethylene/methacrylic acid/isobornyl acrylate or methacrylate, and combinations thereof. Below is a non-limiting example of the chemical structure for suitable ethylene methacrylic/acrylic acid copolymers:

wherein x=50 to 99%; y 1 to 50%; z=0 to 49%; $R_1$=H or $CH_3$; $R_2$ alkyl groups, such as methyl, ethyl, propyl, butyl, pentyl, hexyl, hectyl, octyl, and isobornyl; and n=0 to 12. Suitable ethylene methacrylic/acrylic acid copolymers are sold commercially by DuPont under the tradename NUCREL® Preferably, the acid-containing ethylene copolymers contain from about 10% to about 15% methacrylic acid.

The preferred golf ball compositions comprise one or more ionomer resins having a flexural modulus from about 1000 psi to about 200,000 psi, a grafted metallocene-catalyzed copolymer of an olefin having a flexural modulus from about 500 psi to about 100,000 psi, and at least one non-ionomer having a flexural modulus from about 500 to about 100,000 psi. More preferably, the ionomer resins having a flexural modulus from about 20,000 psi to about 80,000 psi, a grafted metallocene-catalyzed copolymer of an olefin having a flexural modulus from about 1000 psi to 50,000 psi, and at least one non-ionomer having a flexural modulus from about 500 psi to about 75,000 psi.

In a more preferred embodiment of the present invention, a maleic anhydride grafted metallocene-catalyzed polymer is combined with a blend of ionomers and an ethylene-methacrylic acid non-ionomer to form a combination blend suitable for use in golf ball centers, mantle layers, covers, or a combination thereof. In a most preferred embodiment of the present invention, a maleic anhydride grafted metallocene-catalyzed polymer is combined with a blend of a Li-ionomer and a Na-ionomer, and an ethylene-methacrylic acid non-ionomer to form a combination blend suitable for use in a golf ball, preferably in golf ball covers.

The amounts of maleic anhydride grafted metallocene-catalyzed polymers used in the golf ball compositions of the invention can vary from about 5 to about 50 phr of the grafted metallocene-catalyzed polymers, from about 95 to about 50 phr of ionomer, and from about 1 to about 25 phr of non-ionomer, preferably, from about 10 to about 40 phr grafted metallocene-catalyzed polymers, from about 90 to about 60 phr of ionomer, and about 1 to about 20 phr of non-ionomer. The most preferred amounts are from about 15 to 25 phr grafted metallocene-catalyzed polymer, from about 85 to about 75 phr of ionomer, and about 1 to about 10 phr of non-ionomer.

Further compositions may also be added to the compatible blends of the invention, such as, for example, coloring agents, reaction enhancers, crosslinking agents, dyes, lubricants, density-adjusting fillers, excipients, process aids and other compounds commonly added to polymeric materials and/or golf ball covers.

The present invention relates to golf balls of any size. While United States Golf Association ("USGA") specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches.

Additionally, the unvulcanized rubber, such as polybutadiene, in golf balls prepared according to the invention typically has a Mooney viscosity greater than about 20, preferably greater than about 30, and more preferably greater than about 40. Mooney viscosity is typically measured according to ASTM D-1646.

When golf balls are prepared according to the invention, they typically will have dimple coverage greater than about 60 percent, preferably greater than about 65 percent, and more preferably greater than about 70 percent. The flexural modulus of the cover of the golf balls, as measured by ASTM D-790, is typically greater than about 500 psi, and is preferably from about 500 psi to about 150,000 psi. More preferably, the flexural modulus of the cover is from about 1,000 psi to about 100,000 psi. The hardness of the cover is typically from about 35 to about 80 Shore D, preferably from about 40 to about 78 Shore D, and more preferably from about 45 to about 75 Shore D.

Grafted metallocene-catalyzed polymer blend layers may be produced in golf balls in accordance with the present invention by injection molding or compression molding a layer of grafted metallocene-catalyzed polymer blend material about a previously formed center and/or core, cover, or mantle layer. Cores comprising a grafted metallocene-catalyzed polymer blend may also be formed directly by injection molding or compression molding. When the layer or core is injection molded, a physical or chemical blowing or foaming agent may be included to produce a foamed layer. Blowing or foaming agents useful in forming foamed grafted metallocene-catalyzed polymer blends include, but are not limited to organic blowing agents, such as azobis-formamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; disulfonyl hydrazide; 4,4-oxybis benzene sulfonyl hydrazide; p-toluene sulfonyl semicarbizide; barium azodicarboxylate; butylamine nitrile; nitroureas; trihydrazino triazine; phenyl-methyl-uranthane; p-sulfonhydrazide; peroxides; and inorganic blowing agents such as ammonium bicarbonate and sodium bicarbonate. A gas, such as air, nitrogen, carbon dioxide, etc., can also be injected into the blend during the injection molding process.

In a further embodiment, foamed grafted metallocene-catalyzed polymer blends may be formed by blending microspheres with the grafted metallocene-catalyzed polymer blend either during or before the molding process. Polymeric, ceramic, metal, and glass microspheres are useful in the invention, and may be solid or hollow and filled or unfilled. Microspheres up to about 1,000 μm in diameter are useful in the grafted metallocene-catalyzed polymer blends of the invention.

For compression molded grafted metallocene-catalyzed polymer blend layers, half-shells may be made by injection molding a grafted metallocene-catalyzed polymer blend in a conventional half-shell mold or by compression molding sheets of foamed grafted metallocene-catalyzed polymer. The half-shells are placed about a previously formed center or core, cover, or mantle layer, and the assembly is introduced into a compression molding machine, and compression molded at about 250° F. to about 400° F. The molded balls are then cooled while still in the mold, and finally removed when the layer of grafted metallocene-catalyzed polymer blend is hard enough to be handled without deforming. Additional center, mantle, and cover layers are then molded onto the previously molded layers, as needed, until a complete ball is formed. After the final cover layer of the ball has been molded, the ball undergoes various conventional finishing operations such as buffing, painting and stamping.

Blending of the grafted metallocene-catalyzed polymer and ionomer resins is accomplished in a conventional manner using conventional equipment. Good results have been obtained by mixing the grafted metallocene-catalyzed polymer, ionomers, and non-ionomer resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding or for molding flowable grafted metallocene-catalyzed polymer blend using a retractable-pin mold. Such machines are conventional.

In an alternative embodiment of the present invention, the mantle layer and cover are formed of a polymer blend comprising at least one grafted metallocene-catalyzed polymer, at least one ionomer, at least one non-ionomer, and a thermoset or thermoplastic material.

The core may also comprise a center and at least one mantle layer disposed between the center and the cover. The at least one mantle layer may comprise the polymer blend while the cover comprises a thermoset or thermoplastic material. Additionally, the cover may comprise the polymer blend and a thermoplastic material. It should also be understood that if the cover comprises the polymer blend, the mantle layer may comprise a thermoplastic or a thermoset material, the thermoplastic and thermoset material in the mantle layer may be the same or different as those used in the blend, if present. It is preferred that the thermoplastic material comprise at least one ionomer, however, it should be understood that thermoplastic material may also be a non-ionomeric material. Preferred thermoset materials, if used, include polyureas, polyurethanes, and mixtures thereof.

EXAMPLES

These and other aspects of the present invention may be more fully understood by reference to the following examples. While these examples are meant to be illustrative of golf balls made according to the present invention, the present invention is not meant to be limited by the following examples. All parts are by weight unless otherwise specified. Examples 1–13: Effect of Maleic-anhydride-grafted Metallocene Cover Blends on Ball Properties.

As shown in Table 1, batches of 10 to 15 dozen golf balls were prepared having covers incorporating blends of SURLYN® 7940, a copolymer of ethylene and about 14 to about 16 percent methacrylic acid, having about 30 to about 60 percent of the acid groups neutralized with lithium, and a Shore D hardness of about 68, blended with one of EXACT® 4033-MA, a maleic anhydride grafted ethylene-butene metallocene-catalyzed polymer, ENGAGE® 8180-MA, a maleic anhydride grafted ethylene-octene metallocene-catalyzed polymer, EXACT® 4049 an unfunctionalized ethylene-butene metallocene-catalyzed polymer, ENGAGE® 8180, an unfunctionalized ethylene-octene metallocene-catalyzed polymer, and SURLYN® 8320, a very low modulus ionomer ("VLMI"), i.e., a terpolymer of ethylene, 8 to 11 percent methacrylic acid, and n-butyl acrylate, having about 40 to about 60 percent of the acid groups neutralized with sodium and a Shore D hardness of about 35.

As is clearly shown in Table 1, golf balls in accordance with the invention, i.e., golf balls incorporating blends comprising maleic anhydride functionalized metallocene-catalyzed polymers, have an initial velocity that is typically significantly better than that of golf balls having covers comprising VLMI or unfunctionalized metallocene-catalyzed polymers in an amount equivalent to that of the maleic anhydride functionalized metallocene-catalyzed polymers used in the examples. Moreover, the results shown in Table 1 demonstrate that golf balls in accordance with the present invention provide performance that is at least as good, if not superior to golf balls having ionomer blend covers, while having a softer cover, which provides a softer "feel." Although the compression of each of the golf balls of the invention exemplified in Table 1 is relatively low, i.e., having an ATTI compression in the range of 88 to 92, the coefficient of restitution of the golf balls of the invention is at least as high, and, in many cases, significantly better than that of the high compression balls incorporating maleic anhydride modified polymers as disclosed in the Sullivan patents described above. Moreover, tests have shown that the golf balls of the invention are also far more durable than golf balls comprising ionomers blended with polymers formed using catalysts other than metallocenes, such as those disclosed in the Sullivan patents.

TABLE 1

Effect of Maleic-anhydride-grafted Metallocene Cover Blends on Ball Properties

| | #1 | #2 | #3 | #4 | #5 | #6 | #7 | #8 | #9 | #10 | #11 | #12 | #13 |
|---|---|---|---|---|---|---|---|---|---|---|---|---|---|
| Ingredients | | | | | | | | | | | | | |
| SURLYN ® 7940[1] | 80.95 | 66.67 | 52.38 | 80.95 | 66.67 | 52.38 | 80.95 | 66.67 | 80.95 | 66.67 | 80.95 | 66.67 | 52.38 |
| EXACT ® 4033-MA[2] | 14.29 | 28.57 | 42.86 | | | | | | | | | | |
| EXACT ® 4049[3] | | | | 14.29 | 28.57 | 42.86 | | | | | | | |
| ENGAGE ® 8180-MA[4] | | | | | | | 14.29 | 28.57 | | | | | |

TABLE 1-continued

Effect of Maleic-anhydride-grafted Metallocene Cover Blends on Ball Properties

|  | #1 | #2 | #3 | #4 | #5 | #6 | #7 | #8 | #9 | #10 | #11 | #12 | #13 |
|---|---|---|---|---|---|---|---|---|---|---|---|---|---|
| EXACT ® 8180[5] |  |  |  |  |  |  |  |  | 14.29 | 28.57 |  |  |  |
| SURLYN ® 8320[6] |  |  |  |  |  |  |  |  |  |  | 14.29 | 28.57 | 42.86 |
| $TiO_2$ concentrate[7] | 4.76 | 4.76 | 4.76 | 4.76 | 4.76 | 4.76 | 4.76 | 4.76 | 4.76 | 4.76 | 4.76 | 4.76 | 4.76 |
| Ball Properties |  |  |  |  |  |  |  |  |  |  |  |  |  |
| ATTI Compression | 92 | 91 | 88 | 92 | 89 | 86 | 92 | 89 | 90 | 87 | 93 | 90 | 89 |
| Hardness (Shore D)[8] | 64 | 60 | 54 | 64 | 58 | 53 | 64 | 58 | 62 | 57 | 67 | 62 | 58 |
| Initial velocity (ft/s) | 252.5 | 252.2 | 251.6 | 252.1 | 252.0 | 251.6 | 252.2 | 251.9 | 251.9 | 251.7 | 252.2 | 251.3 | 250.8 |
| COR @ 125 ft/s | 0.807 | 0.802 | 0.796 | 0.803 | 0.800 | 0.796 | 0.805 | 0.798 | 0.802 | 0.797 | 0.803 | 0.797 | 0.792 |

[1]SURLYN ® 7940 is a copolymer of ethylene and methacrylic acid partially neutralized with Li ion
[2]EXACT ® 4033-MA is a maleic anhydride grafted ethylene-butene metallocene-catalyzed copolymer
[3]EXACT ® 4049 is an unfunctionalized ethylene-butene metallocene-catalyzed copolymer
[4]ENGAGE ® 8180-MA is a maleic anhydride grafted ethylene-octene metallocene-catalyzed copolymer
[5]ENGAGE ® 8180 is an unfunctionalized ethylene-octene metallocene-catalyzed copolymer
[6]SURLYN ® 8320 is a terpolymer of ethylene and methacrylic acid and n-butyl acrylate partially neutralized with Na ion
[7]$TiO_2$ concentrate is $TiO_2$ dispersed in SURLYN ® carrier resin containing 9–11% MAA partially neutralized with Na ion.
[8]ASTM - D2240

Examples 14–15: Golf Ball Cover Prepared According to the Present Invention Compared to Conventional Cover.

As shown in Table 2, two blends were prepared. Example 14 includes: (a) SURLYN® 7940, a copolymer of ethylene and up to about 15 percent methacrylic acid, having about 40 to about 60 percent of the acid groups neutralized with lithium; (b) SURLYN® 8945, a copolymer of ethylene, about 15 percent methacrylic acid, having about 20 to 40 percent of the acid groups neutralized with sodium; (c) SURLYN® NMO 525D, a maleic anhydride grafted ethylene-butene metallocene-catalyzed polymer; and (d) $TiO_2$ concentrate dispersed in SURLYN® carrier resin containing 9–11% methacrylic acid partially neutralized with sodium ion. Example 15 includes: (a) SURLYN® 7940; (b) SURLYN® 8945; (c) NUCREL® 960, a non-ionomeric ethylene-methacrylic acid polymer having about 10 percent acid groups; (d) SURLYN® NMO 525D, maleic anhydride grafted ethylene-butene metallocene-catalyzed polymer; and (e) $TiO_2$ concentrate.

TABLE 2: Effect of Non-ionomer in Cover Compositions and Material Properties

TABLE 2

Effect of Non-ionomer in Cover Compositions and Material Properties

| Ingredients | Example 14 (prior art) | Example 15 |
|---|---|---|
| SURLYN ® 7940 (ionomer) | 60 | 60 |
| SURLYN ® 8945 (ionomer) | 20 | 10 |
| SURLYN ® NMO 525D (grafted metallocene-catalyzed polymer) | 20 | 20 |
| NUCREL ® 960 (non-ionomer) | — | 10 |
| $TiO_2$ concentrate | 5 | 5 |
| Blend Properties |  |  |
| Melt Flow Index[1] (g/10 min) | 196 | 2.5 |
| Flexural Modulus[2] (kpsi) | 44.9 | 37.0 |
| Hardness (Shore D)[3] | 55 | 54 |

[1]measured at 190° C. under 2.16-kg load; ASTM - D1238
[2]ASTM - D790
[3]ASTM - D2240

Examples 14 and 15 are both reactive blends that include maleic-anhydride-grafted metallocene-catalyzed ethylene-butene copolymer. Table 2 also shows the surprising and unexpected results arising from the addition of a non-ionomeric component to Example 15. The melt flow index of Example 15 is about 28% higher than that exhibited by Example 14, which facilitates processing of the cover. Additionally, the flexural modulus of Example 15 is advantageously about 18% lower than that exhibited by Example 14. The higher melt flow index allows the temperature range at which the blend may be effectively molded to be significantly broader than, for example, the temperature range available for properly molding components comprising the blend of Example 14 (i.e., the blend of Example 14 has a much narrower temperature window). The larger temperature window in which to properly mold the golf ball covers and components allows more opportunities for better optimization of the molding process, resulting in more homogeneous and consistent golf balls.

Using the blends disclosed in Table 2, two golf balls were constructed, the first having a cover constructed of the blend of Example 14 and the second having a cover constructed of the blend of Example 15. For both golf balls, cores having about a 1.590-in diameter were used. The cores were a blend of polybutadiene, a peroxide initiator, zinc diacrylate, regrind, and pigment. This blend resulted in each core having a compression of about 73 and a hardness of about 80 Shore C. Half-shell cups, each having a thickness of about 0.045 inches, were made using the above cover formulations (see Table 2) and were molded over the about 1.590-in-diameter cores. The two golf balls were tested for a variety of physical and mechanical properties, some of the results of which are shown, in tabular form, in Table 3 below.

TABLE 3

Effect of Non-ionomer in Cover Compositions on Ball Properties

| Properties | Example 14 (prior art) | Example 15 |
|---|---|---|
| ATTI Compression | 78 | 75 |
| Cover Hardness (Shore D) | 60 | 60 |
| Coefficient of Restitution (at 125 ft/s) | 0.802 | 0.802 |
| Initial Velocity (ft/s) | 251.8 | 251.9 |
| Spin Rate from Standard Driver (rpm) | 3381 | 3363 |
| Spin Rate from Average Driver (rpm) | 3641 | 3582 |
| Spin Rate from 8-iron (rpm) | 7877 | 7872 |

TABLE 3-continued

Effect of Non-ionomer in Cover Compositions on Ball Properties

| Properties | Example 14 (prior art) | Example 15 |
| --- | --- | --- |
| Spin Rate from Half Wedge (rpm) | 6445 | 6532 |

Table 3 clearly shows surprising and unexpected results exhibited by the golf ball having a cover that further comprises a non-ionomeric component (Example 15), as disclosed in Table 2. Golf ball compression decreased, compared to a golf ball having a cover constructed with the blend of Example 14, without any associated adverse change in cover hardness, coefficient of restitution, initial velocity, and spin rates from an average driver, an 8-iron, and a half-wedge. As such, the lower ball compression of the golf ball of Example 15 may provide better "feel" than the golf ball of Example 14, but without any loss of any beneficial golf ball properties.

The term "about," as used herein in connection with one or more numbers or numerical ranges, should be understood to refer to all such numbers, including all numbers in a range.

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising a core and a cover, wherein at least one of the cover or the core is formed from a polymer blend comprising at least one grafted metallocene-catalyzed polymer, at least one ionomer, and at least one non-ionomer.

2. The golf ball of claim 1, wherein the golf ball comprises a cover having at least one of a dimple coverage of greater than about 60 percent, a hardness from about 35 to 80 Shore D, or a flexural modulus of greater than about 500 psi, and wherein the golf ball has at least one of a compression from about 50 to 120 or a coefficient of restitution of greater than about 0.7.

3. The golf ball of claim 1, wherein the grafted metallocene-catalyzed polymer has a flexural modulus of from about 500 psi to about 100,000 psi, the ionomer has a flexural modulus of from about 1,000 psi to about 200,000 psi, and the non-ionomer has a flexural modulus of from about 500 psi to about 100,000 psi.

4. The golf ball of claim 1, wherein the cover comprises the polymer blend.

5. The golf ball of claim 4, wherein the cover layer has a Shore D hardness of less than about 75.

6. The golf ball of claim 4, wherein the cover layer has a thickness from about 0.015 to about 0.125 in.

7. The golf ball of claim 1, wherein the grafted metallocene-catalyzed polymer has been functionalized by grafting an ethylenically-unsaturated monomer onto the at least one metallocene-catalyzed polymer using a post-polymerization reaction.

8. The golf ball of claim 7, wherein the ethylenically-unsaturated monomer is an olefinic monomer having a functional group selected from the group consisting of sulfonic acid, sulfonic acid derivatives, chlorosulfonic acid, vinyl ethers, vinyl esters, primary amines, secondary amines, tertiary amines, mono-carboxylic acids, dicarboxylic acids, partially or fully ester derivatized mono-carboxylic acids, partially or fully ester derivatized dicarboxylic acids, anhydrides of dicarboxylic acids, cyclic imides of dicarboxylic acids, ionomeric derivatives thereof, and combinations thereof.

9. The golf ball of claim 8, wherein the ethylenically-unsaturated monomer comprises maleic anhydride.

10. The golf ball of claim 1, wherein the at least one grafted metallocene-catalyzed polymer is present in an amount from about 5 to about 50 phr.

11. The golf ball of claim 10, wherein the at least one grafted metallocene-catalyzed polymer is present in an amount from about 5 to about 30 phr.

12. The golf ball of claim 1, wherein the at least one ionomer is present in an amount from about 95 to about 50 phr.

13. The golf ball of claim 12, wherein the at least one ionomer is present in an amount from about 95 to about 70 phr.

14. The golf ball of claim 1, wherein the at least one non-ionomer is present in an amount from about 1 to about 25 phr.

15. The golf ball of claim 14, wherein the at least one non-ionomer is present in an amount from about 5 to about 20 phr.

16. The golf ball according to claim 1, wherein the core comprises the polymer blend.

17. The golf ball of claim 1, wherein the core comprises a center and at least one mantle layer disposed between the center and the cover.

18. The golf ball of claim 17, wherein the at least one mantle layer comprises the polymer blend and the cover comprises a thermoset or thermoplastic material.

19. The golf ball of claim 18, wherein the cover comprises the polymer blend and a thermoplastic material.

20. The golf ball of claim 18, wherein the thermoplastic material comprises at least one ionomer.

21. The golf ball of claim 18, wherein the thermoset material comprises polyureas, polyurethanes, and mixtures thereof.

22. The golf ball of claim 18, wherein at least one of the core, cover, or mantle layer comprises a density-adjusting filler.

23. The golf ball of claim 22, wherein the density-adjusting filler comprises zinc oxide, barium sulfate, silica, calcium carbonate, zinc carbonate, tungsten, titanium, and mixtures thereof.

24. The golf ball of claim 17, wherein the at least one mantle layer comprises the polymer blend.

25. The golf ball of claim 17, wherein the center is fluid-filled.

26. The golf ball of claim 17, wherein the center is a solid or hollow center.

27. The golf ball of claim 17, wherein the at least one mantle layer comprises a tensioned elastomeric thread disposed about a fluid-filled center or a solid center.

28. The golf ball of claim 1, wherein the grafted metallocene-catalyzed polymer is formed by grafting an ethylenically-unsaturated monomer onto a metallocene-catalyzed polymer selected from the group consisting of polyethylene and copolymers of ethylene with propylene, butene, pentene, hexene, heptene, octene, and norbomene.

29. The golf ball of claim 28, wherein the grafted metallocene-catalyzed polymer is formed by grafting an ethylenically-unsaturated monomer onto a metallocene-catalyzed polymer selected from the group consisting of polyethylene and copolymers of ethylene with butene.

30. The golf ball of claim 1, wherein the grafted metallocene-catalyzed polymer is formed by grafting an ethylenically-unsaturated monomer onto a metallocene-catalyzed polymer of the formula:

wherein $R_1$ is hydrogen;
$R_2$ is hydrogen or lower alkyl selected from the group consisting of $CH_3$, $C_2H_5$, $C_3H_7$, $C_4H_9$, and $C_5H_{11}$;
$R_3$ is hydrogen or lower alkyl selected from the group consisting $CH_3$, $C_2H_5$, $C_3H_7$, $C_4H_9$, and $C_5H_{11}$;
R4 is selected from the group consisting of H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, and phenyl, in which from 1 to 5 H and $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;
$R_5$ is hydrogen, lower alkyl including $C_1$–$C_5$, carbocyclic, aromatic or heterocyclic;
$R_6$ is hydrogen, lower alkyl including $C_1$–$C_5$, carbocyclic, aromatic or heterocyclic; and
wherein x ranges from 99 to 50 weight percent of the polymer, y ranges from 1 to 50 weight percent of the polymer and z ranges from 0 to 49 weight percent of the polymer.

31. The golf ball of claim 1, wherein the polymer blend has a foamed structure.

32. The golf ball of claim 1, wherein the non-ionomeric polymer has the chemical structure:

wherein x=50 to 99 weight %; y=1 to 50 weight %; z 0 to 49 weight %; $R_1$ H or $CH_3$; $R_2$=methyl, ethyl, propyl, butyl, pentyl, hexyl, hectyl, octyl, or isobornyl; and n=0 to 12.

33. The golf ball of claim 32, wherein the non-ionomer comprises an olefinic homopolymer, an olefinic copolymer, an olefinic terpolymer, and mixtures thereof.

34. The golf ball of claim 33, wherein the non-ionomer is an acid-containing ethylene copolymer comprising ethylene/methacrylic acid, ethylene/acrylic acid, and mixtures thereof.

35. The golf ball of claim 33, wherein the non-ionomer is an acid-containing ethylene terpolymer comprising ethylene/acrylic acid/n- or isobutyl acrylate, ethylene/methacrylic acid/n- or iso-butyl acrylate, ethylene/acrylic acid/methyl acrylate, ethylene/methacrylic acid/methyl acrylate, ethylene/acrylic acid/iso-bornyl acrylate or methacrylate, ethylene/methacrylic acid/isobornyl acrylate or methacrylate, and mixtures thereof.

36. The golf ball of claim 1, wherein the non-ionomer is present in an amount from about 1 phr to about 25 phr of the total polymer.

37. The golf ball of claim 1, wherein the polymer blend further comprises a non-grafted metallocene catalyzed copolymer.

38. The golf ball of claim 37, wherein the non-grafted metallocene catalyzed copolymer comprises polyolefin plastomers, polyolefin elastomers, or a mixture thereof.

39. A golf ball comprising a core having a center, a cover, and at least one mantle layer disposed between the core and the cover, wherein at least one of the cover, the center, and the at least one mantle layer is formed from a polymer blend comprising from about 5 to about 50 phr of at least one grafted metallocene-catalyzed polymer, from about 95 to about 50 phr of at least one ionomer, and from about 1 to about 25 phr of at least one non-ionomer.

40. A golf ball comprising a core having a center, a cover, and at least one mantle layer disposed between the core and the cover, wherein at least one of the cover, the center, and the at least one mantle layer is formed from a polymer blend comprising:

from about 5 to about 50 phr of at least one grafted metallocene-catalyzed polymer formed by grafting an ethylenically-unsaturated monomer onto a metallocene-catalyzed polymer selected from the group consisting of polyethylene and copolymers of ethylene and butene;

from about 95 to about 50 phr of at least two ionomers, each comprising an ethylene methacrylic/acrylic acid copolymer, wherein at least one ionomer is partially neutralized with lithium and at least one ionomer is partially neutralized with sodium; and from about 1 to about 25 phr of at least one non-ionomer of the chemical structure:

wherein x=50 to 99 weight %; y=1 to 50 weight %; z=0 to 49 weight %; $R_1$=H or $CH_3$; $R_2$=methyl, ethyl, propyl, butyl, pentyl, hexyl, hectyl, octyl, or isobornyl; and n=0 to 12.

* * * * *